United States Patent
Iyengar

(10) Patent No.: US 6,874,146 B1
(45) Date of Patent: Mar. 29, 2005

(54) METADATA DRIVEN SYSTEM FOR EFFECTING EXTENSIBLE DATA INTERCHANGE BASED ON UNIVERSAL MODELING LANGUAGE (UML), META OBJECT FACILITY (MOF) AND EXTENSIBLE MARKUP LANGUAGE (XML) STANDARDS

(75) Inventor: Sridhar Srinivasa Iyengar, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/345,289

(22) Filed: Jun. 30, 1999

(51) Int. Cl.[7] .................................................. G06F 9/46
(52) U.S. Cl. ........................ 719/313; 717/101; 717/104; 707/101; 707/102; 715/513
(58) Field of Search .............................. 707/101, 104.1; 715/513; 717/101–123, 136–161; 719/313, 315, 316

(56) References Cited

U.S. PATENT DOCUMENTS

| | | | | |
|---|---|---|---|---|
| 5,721,925 A | * | 2/1998 | Cheng et al. | 709/315 |
| 5,889,992 A | * | 3/1999 | Koerbeer | 717/108 |
| 6,014,680 A | * | 1/2000 | Sato et al. | 707/513 |
| 6,018,627 A | * | 1/2000 | Iyengar et al. | 717/103 |
| 6,023,578 A | * | 2/2000 | Birsan et al. | 717/105 |
| 6,023,579 A | * | 2/2000 | Hellgren et al. | 717/108 |
| 6,038,393 A | * | 3/2000 | Iyengar et al. | 717/104 |

OTHER PUBLICATIONS

Brodsky S. "XMI Opens Application Interchange" IBM Mar. 1999 pp. 1–12.*
"XML Metadata Interchange (XMI)" OMG Jul. 6, 1998 pp. 1–170.*
"Stream–based Model Interchange Format" Framingham Corporate Center Dec. 4, 1997 pp. 1–14.*
Bray, Tim et. al. "Extensible Markup Language (XMI) 1.0" W3C Feb. 10, 1998 pp. 9–11.*
Crawley, Stephen et. al. "Type System Instantiation using the Meta–Object Facility", Distributed Systems Technology Centre May 23, 1997 pp. 1–10.*
"XML Metadata Interchange (XMI)" OMG Jul. 6, 1998 pp. 4–20—5–34.*
Crawley S Meta–meta is better–better University of Queensland Australia.*

* cited by examiner

Primary Examiner—St. John Courtenay, III
Assistant Examiner—Charles Anya
(74) Attorney, Agent, or Firm—Mark T. Starr; Lise A. Rode; Michael B. Atlass

(57) ABSTRACT

A method is disclosed for effecting data interchange among software tools and repositories in a distributed heterogeneous environment in a computer system having at least one repository of a first type and at least one software modeling tool of a second type. The method includes the steps of registering and storing metadata describing a meta model in the repository. Next, a set of rules and streams of data are generated based on the rules, and then documents conforming to each of the metamodels are generated by reading the set of rules. An importer is written for use in importing into the repository the streams of data; and, an exporter is written for use in exporting from the repository the streams of data.

8 Claims, 6 Drawing Sheets

| META LEVEL | METADATA | XMI DTD'S | XMI DOCUMENTS |
|---|---|---|---|
| M3 | MOF META-METAMODEL | MOF AS XML DTD | |
| M2 | UML & OTHER METAMODELS | UML & OTHERS AS XML DTDS | MOF METAMODELS AS XML DOCUMENTS |
| M1 | MODEL | | UML & OTHER MODELS AS XML DOCUMENTS |
| M0 | INSTANCES | | |

FIG. 4

METADATA DRIVEN SYSTEM FOR EFFECTING EXTENSIBLE DATA INTERCHANGE BASED ON UNIVERSAL MODELING LANGUAGE (UML), META OBJECT FACILITY (MOF) AND EXTENSIBLE MARKUP LANGUAGE (XML) STANDARDS

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS REFERENCE TO RELATED APPLICATIONS

This patent document relates to the following patent applications, assigned to the same assignee hereof, which are incorporated herein by reference.

U.S. Ser. No. 09/282,345, now issued as U.S. Pat. No. 6,289,501, entitled A METHOD AND SYSTEM FOR GENERATING A SIMPLE DOCUMENT TYPE DEFINITION FOR DATA INTERCHANGE AMONG SOFTWARE TOOLS;

U.S. Ser. No. 09/282,102, now issued as U.S. Pat. No. 6,253,366, entitled A METHOD AND SYSTEM FOR GENERATING A COMPACT DOCUMENT TYPE DEFINITION FOR DATA INTERCHANGE AMONG SOFTWARE TOOLS;

U.S. Ser. No. 09/282,230, now issued as U.S. Pat. No. 6,381,743, entitled A METHOD AND SYSTEM FOR GENERATING A HIERARCHICAL DOCUMENT TYPE DEFINITION FOR DATA INTERCHANGE AMONG SOFTWARE TOOLS;

U.S. Ser. No. 09/322,137, now issued as U.S. Pat. No. 6,292,932, entitled A SYSTEM AND METHOD FOR CONVERTING FROM ONE MODELING LANGUAGE TO ANOTHER;

U.S. Ser. No. 09/345,290, now issued as U.S. Pat. No. 6,408,311, entitled A METHOD FOR IDENTIFYING UML OBJECTS IN A REPOSITORY WITH OBJECTS IN XML CONTENT; and, U.S. Ser. No. 09/345,291, now issued as U.S. Pat. No. 6,330,569, entitled A METHOD FOR VERSIONING A UML MODEL IN A REPOSITORY IN ACCORDANCE WITH AN UPDATED XML REPRESENTATION OF THE UML MODEL.

FIELD OF THE INVENTION

The present invention relates to a method and system for enabling easy interchange of metadata among repositories, modeling tools and application-implementing models and meta models expressible in a meta object framework.

BACKGROUND OF THE INVENTION

The Web is the visual interface to the Internet's vast collection of resources. Today, HTML (HyperText Markup Language) is the predominant language for expressing Web pages. An HTML document comprises the textual content of the document embedded in matched display tags which specify the visual presentation of the content. A well-designed HTML document is visually interesting to a human viewer when displayed in a Web browser. However, the automatic extraction of information from HTML documents is difficult since HTML tags are designed to express presentation rather than semantic information. This makes HTML a less than ideal medium for general electronic interchange in the Internet.

HTML is a specific language of the more powerful SGML (Standard Generalized Markup Language), a sophisticated tag language that separates view from content and data from metadata. Due to SGML's complexity, and the complexity of the tools required, it has not achieved widespread acceptance.

XML, the Extensible Markup Language, is a new format designed to bring structured information to the Web. It is a Web-based language for electronic data interchange. XML is an open technology standard of the World Wide Web Consortium (W3C), which is the standards group responsible for maintaining and advancing HTML and other Web-related standards.

XML is a sub-set of SGML that maintains the important architectural aspects of contextual separation while removing nonessential features. The XML document format embeds the content within tags that express the structure. XML also provides the ability to express rules for the structure (i.e., grammar) of a document. These two features allow automatic separation of data and metadata, and allow generic tools to validate an XML document against its grammar.

Unlike HTML, an XML document does not include presentation information. Instead, an XML document may be rendered for visual presentation by applying layout style information with technologies such as XSL (Extensible Style Language). Web sites and browsers are rapidly adding XML and XSL to their functionality.

The XML approach to structured data interchange has been validated through the wide experience with XML itself and with other members of the XML family: SGML, which is used in high-end document processing, and HTML, the predominant language of the Web.

XML is widely believed to be the next step in the evolution of the Web. This is demonstrated by announcements by Netscape and Microsoft that upcoming versions of the leading Web browsers, Netscape Navigator and Internet Explorer, will incorporate XML support.

While XML is still in its infancy, there are many well-documented applications of XML. Example application domains include Web commerce, publishing, repositories, modeling, databases and data warehouses, services, financial, health care, semiconductors, inventory access, and more.

XML is gaining widespread acceptance as the de facto standard for representing structured information in the context of the Worldwide Web and beyond. The XML language is defined by the Worldwide Web's. "Extensible Markup Language (XML) Recommendation 1.0" document [Rec-xml-19980210]. This definition includes a specification of XML in Extended Backus-Naur Form (EBNF) notation.

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse, and tool and technology models may be developed to manipulate the tool information in the repository. However, the transferring of data within models, from tool to tool, or from a tool to the repository has been a cumbersome and unyielding task for a long time. Previous Interchange mechanisms have typically used extensible structured references; and the MOF user programming representation.

SUMMARY OF THE INVENTION

An object of the present invention is to integrate three disciplines so far not integrated: the Unified Modeling Language ("UML"), Meta Object Facility ("MOF") Modeling, and XML. That is, the present invention uses models defined in UML, registers them in a MOF compliant repository and generates XML Document Type Definitions ("MOF") and XML streams or documents.

It is another object of the present invention to provide a system and method that employs XML Metadata Interchange ("XML") for stream-based interchange of metadata.

Yet another object of the present invention is to provide Metadata Interchange for developers using a system and method that employs UML notation for representing models and meta-models.

Still another object of the present invention is to provide a system and method that employs standard information models (e.g., UML) to describe the semantics of object analysis and design models, while extending this capability to provide automated Metadata Interchange.

Still another object of the present invention is to provide a method and system for interchanging metadata for any MOF metamodel.

There are many advantages in basing metadata interchange format on XML. These include:

- XML is an open, platform independent and vendor-independent standard.
- XML supports the international character set standards of extended ISO Unicode. p1 XML is meta-model neutral and can represent meta-models compliant with meta-meta-model, the MOF and OMG standard, the specification of which was led by Unisys, assignee hereof, and is covered by U.S. Pat. No. 5,644,764.
- The XML standard itself is programming language-neutral and API-neutral. A range of XML APIs are available, giving the programmer a choice of access methods to create, view and integrate XML information. Leading XML APIs include DOM, SAX, and Web-DAV.
- The cost of entry for XML information providers is low. XML documents can currently be created by hand using any text editor. In the future, XML-based WYSI-WYG ("What You See Is What You Get") editors with support for XSL rendering will allow creation of XML documents. XML's tag structure and textual syntax make it as easy to read as HTML, and is clearly superior for conveying structured information.
- The cost of entry for automatic XML document producers and consumers is low. A growing set of tools is available for XML development. This includes a complete, free, commercially unrestricted XML parser written in Java readily available from any sources, including IBM. A variety of other XML support tools including implementations of the XML APIs are available on the Internet.

These and other objects, which will become apparent as the invention is described in detail below, are provided by a method for effecting data interchange among software tools and repositories in a distributed heterogeneous environment, which includes a computer system having at least one repository of a first type and at least one software modeling tool of a second type. The method includes the steps of registering and storing metadata describing a meta model in the repository. Next, a set of rules and streams of data are generated based on the rules, and then documents conforming to each of the metamodels are generated by reading the set of rules. An importer is written for use in importing into the repository the streams of data; and, an exporter is written for use in exporting from the repository the streams of data.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not at restrictive, and what is intended to be protected by Letters Patent is set forth in the appended claims. The present invention will become apparent when taken in conjunction with the following description and attached drawings, wherein like characters indicate like parts, and which drawings form a part of this application. For example, while XMI is initially expected to be used in modeling tools and repositories, it is soon expected to be used in data warehouses, enterprise application integration, such as supply chain management.

BRIEF DESCRIPTION OF THE DRAWINGS

FIG. 4 is a matrix diagram showing the levels of abstraction of data in a meta-model architecture of the corresponding data-interchange formats.

DETAILED DESCRIPTION OF ONE EMBODIMENT

Figure 1:
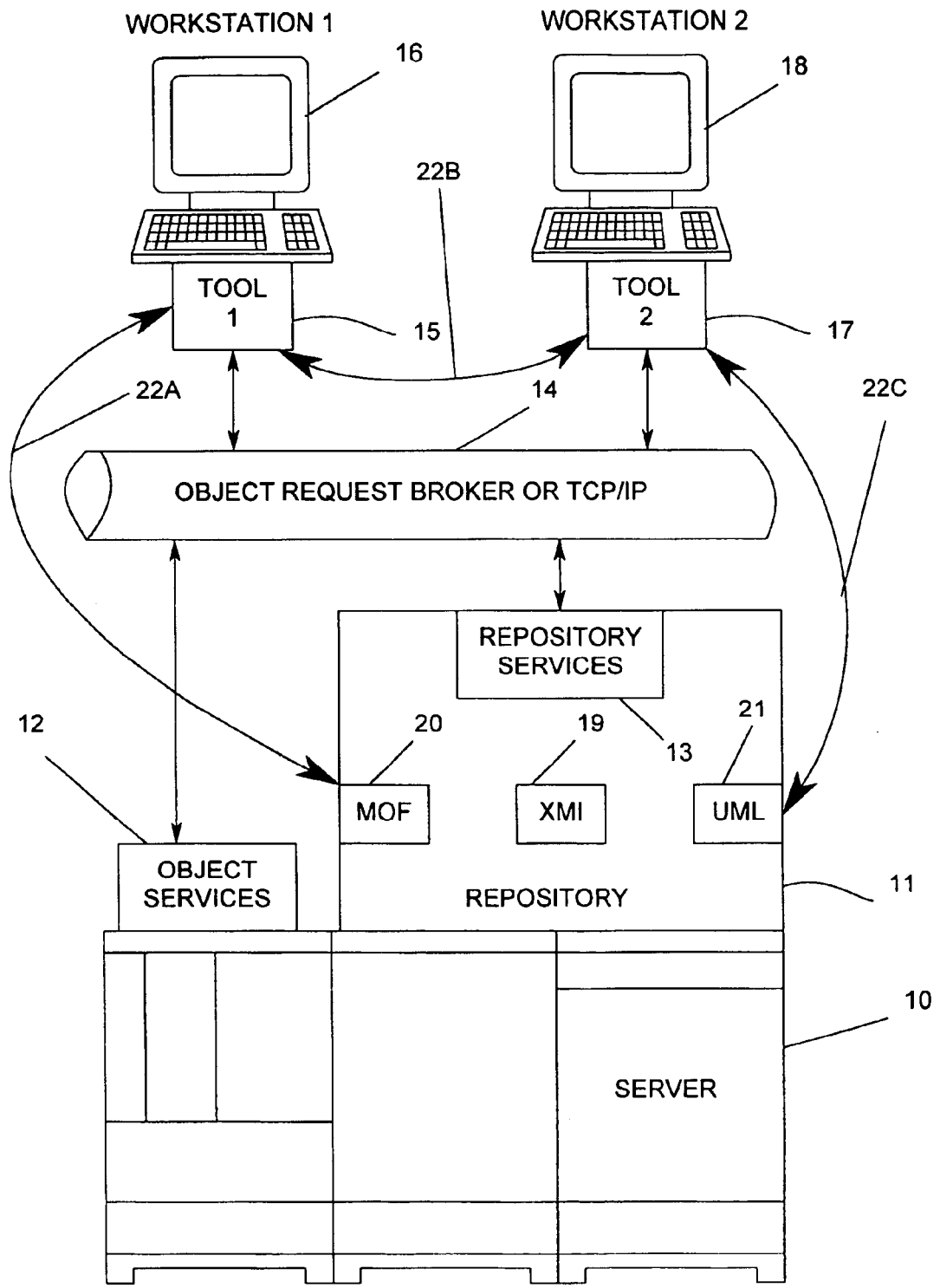
FIG. 1 is a block diagram of a system that may employ the method and system of the present invention, including software modules of the invention in a development environment.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object.

For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

The prefix "meta" as used herein shall describe a relationship as well as a concept. For example, "metadata" describes data. In a similar fashion, a meta-object is an object that represents "metadata"; and, "meta-model" means a model that defines an abstract language for expressing other models. A "meta-meta-model" means a model that defines an abstract language for expressing meta-models. The relationship between a meta-meta-model and a meta-model is analogous to the relationship between a meta-model and a model. The term model is generally used herein to denote a description of something in the real world. The concept of a model is highly fluid, and depends upon one's point of view. For example, where one is building an entire system, a model may include all of the metadata for the system. On the other hand, others are only concerned with certain components (e.g. programs A and B) or certain kinds of detail (e.g. wiring diagrams) of the system.

Metadata is a general term for data that in some sense describes information. The information so described may be information represented in a computer system; e.g., in the form of files, databases, running program instances and so on. Alternatively, the information may be embodied in a system, with the metadata being a description of some aspect of the system such as a part of its design. Metadata is itself information, and can accordingly be described by other metadata. In MOF terminology, metadata that describes metadata is called meta-metadata, and a model that consists of a meta-metadata is called a meta-model.

Users of workgroup-based and component development tools are finding it increasingly difficult to coordinate their software development efforts across the enterprise. A solution in accordance with the present invention employs the benefits of XMI (XML Metadata Interchange), which is an open industry standard that combines the benefits of the Web-based XML standard. The invention defines, validates and shares document formats on the Web with the Meta Object Facilities to provide a means for generating models to allow the development tools to share information. One use of the present invention is to define an XML DTD for the object-oriented UML. The XML Modeling Interface ("XMI") disclosed herein provides application developers with a common language for specifying transfer syntax for information interchange between development languages that allow visualizing, constructing and documenting of distributed objects and business models. Each transfer syntax in XMI is defined by a DTD. An implementation of the XMI specification as embodied in the present invention will enable integration of development tools from multiple vendors, collaboration and distribution of object-oriented design and database schema information, and enhancement of the life cycle of information resources.

Software architectures based on meta models are transforming the way designs may be implemented for dynamic distributed systems. The UML and MOF specifications establish a robust meta model architecture for distributed object applications. The XMI specification extends this architecture by leveraging technologies developed for the Web to exchange information between tools, applications and repositories.

The present invention contemplates the implementation of a framework for stream-based Model Interchange Format for exchanging metadata based on the Worldwide Web Consortium ("W3C") Extensible Markup Language (XML). The XML-based Metadata Interchange (XMI) of the present invention has two major components:

The XML Document Type Definitions ("DTD") Production Rules for producing XML DTDs for XMI encoded metadata are specified in the above-cited patent applications, Ser. Nos. 09/282,345, now issued as U.S. Pat. No. 6,289,501; 09/282,102, now issued as U.S. Pat. No. 6,253,366; and, 09/282,230, now issued as U.S. Pat. No. 6,381,743. XMI DTDs server as syntax specifications for XMI documents, and allow generic XML tools to be used to compose and validate XMI documents.

The XML Document Production Rules for encoding metadata into an XML compatible document. The production rules can be applied in reverse to decode XMI documents and reconstruct the metadata.

XMI is an OMG standard and its standardization was led by Unisys, assignee hereof. Reference is made herein to the XML Metadata Interchange (XMI) Proposal to the OMG OA&DTF REP 3: Stream-based Model Interchange Format (SMIF), dated Oct. 20, 1998.

A DTD is XML's way of defining the syntax of an XML document. An XML DTD defines the different kinds of elements that can appear in a valid document, and the patterns of element nesting that are allowed.

For example, a DTD for a Car could contain the following declaration:

<!Element Car (Make, Model, Year, Color, Price)>

This indicates that for a Car, the DTD must contain each of the Make, Model, Year, Color, and Price elements. The declaration for an element can have a more complex grammar, including multiplicities such as '?' meaning zero to one, " meaning one, , '*' meaning zero or more, and '+' meaning one or more. Reference is made to a White Paper by S. Brodsky of IBM, entitled "XMI Opens Application Interchange", dated Mar. 30, 1999, which may be found on the Internet at: http://www.software.ibm.com/ad/standards/xmiwhite0399.pdf The XMI system and method of the present invention supports the interchange of any kind of metadata that can be expressed using the MOF specification, including both model and meta-model information. The invention supports the encoding of metadata consisting of both complete models and model fragments, as well as tool-specific extension metadata. XMI has optional support for interchange of metadata in differential form. The present invention uses XMI for metadata interchange with and between non-CORBA based metadata repositories and tools also.

XML documents are tree-based structures of matched tag pairs containing nested tags and data. In combination with its advance linking capabilities, XML can encode a wide variety of information structures. The rules that specify how the tags are structures are called a Document Type Declaration or DTD.

In the simple case, an XML tag consists of a tag name enclosed by less-than ('<') and greater-than ('>') characters. Tags in an XML document always come in pairs consisting of an opening tag and a closing tag. The closing tag in a pair has the name of the opening tag preceded by a slash symbol. Formally, a balanced tag pair is called an element, and the material between the opening and closing tags is called the element's content. The following example shows a simple element:

<Dog>a description of my dog</Dog>

The content of an element may include other elements which may contain other elements in turn. However, at all levels of nesting, the closing tag for each element must be closed before its surrounding element may be closed. This requirement to balance the tags is what provides XML with its tree data structure and is a key architectural feature missing from HTML.

This is a simple example document describing a Car. (New lines and indentation have no semantic significance in XML. They are included here simply to highlight the structure of the example document.)

<Car>
   <Make> Ford </make>
   <Model> Mustang </Model>
   <Year> 1998 </Year>
   <Color> red</Color>
   <Price> 25000 </Price>
<Car>

The Car element contains five nested elements which describe it in more detail: Make, Model, Year, Color, and Price. The content of each of the nested elements encodes a value in some agreed format.

In addition to contents, an XML element may contain attributes. Element attributes are expressed in the opening tag of the element as a list of name value pairs following the tag name. For example:

<Class xml.label="cl"> </Class>

XML defines a special attribute, the ID, which can be used to attach a unique identifier to an element in the context of a document. These ID's can be used to cross-link the elements to express meaning that cannot be expressed in the confines of XML's strict tree structure.

Referring now to FIG. 1, a block diagram of the system that may employ the present invention, including software modules thereof, is shown in a development environment. A server 10 executes a variety of software including a repository 11 and object services 12. The repository 11 includes a set of repository services 13, which also couple the repository to an object request broker ("ORB") 14. The object services 12 also couples the server to the ORB 14. It is noted that a TCP/IP connection will suffice in lieu of the ORB 14. The XML Documents may also be physically exchanged using a storage medium, such as a floppy disk. A first tool 15, which is being executed by a first workstation 16, is coupled to the ORB 14. In a similar manner, a second tool 17, which is being executed by a second workstation 18, is also coupled to the ORB 14.

In the disclosed embodiment, the repository 11 is a specialized, extensible object-oriented database application that adds value to a database system, which allows customization of a particular domain (such as application development).

The repository 11 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992, for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, now issued as U.S. Pat. No. 6,105,073, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, now issued as U.S. Pat. No. 6,018,627, for TOOL-INDEPENDENT APPLICATION DEVELOPMENT; and, pending application Ser. No. 08/934,834, filed on Sep. 22, 1997, now issued as U.S. Pat. No. 6,038,393, for EXCHANGING INFORMATION BETWEEN DIFFERENT OBJECT MODELS AND UML; each of which are hereby incorporated by reference as if set forth in full herein.

Repository models typically contain classes, data-types and operations. As more and more complex models are being built, the need arises for a method and system to transfer data in a model from place to place; e.g., from a UML ("Unified Modeling Language") compliant tool to a MOF compliant repository. The present invention helps solve this problem by providing a means to enable easy interchange of metadata between modeling tools that are based on the Object Management Group UML and repositories that are based on OMG Meta Object Facility in distributed heterogeneous environments. The present invention integrates three key industry standards in the repository 11:

XML, which is eXtensible Mark Language, a World Wide Web Consortium standard;

UML, the Unified Modeling Language, an OMG modeling standard; and

MOF, the Meta Object Facility, an OMG meta-modeling and metadata repository standard.

The present invention also allows for the exchange of information within non-UML models.

Figure 2:
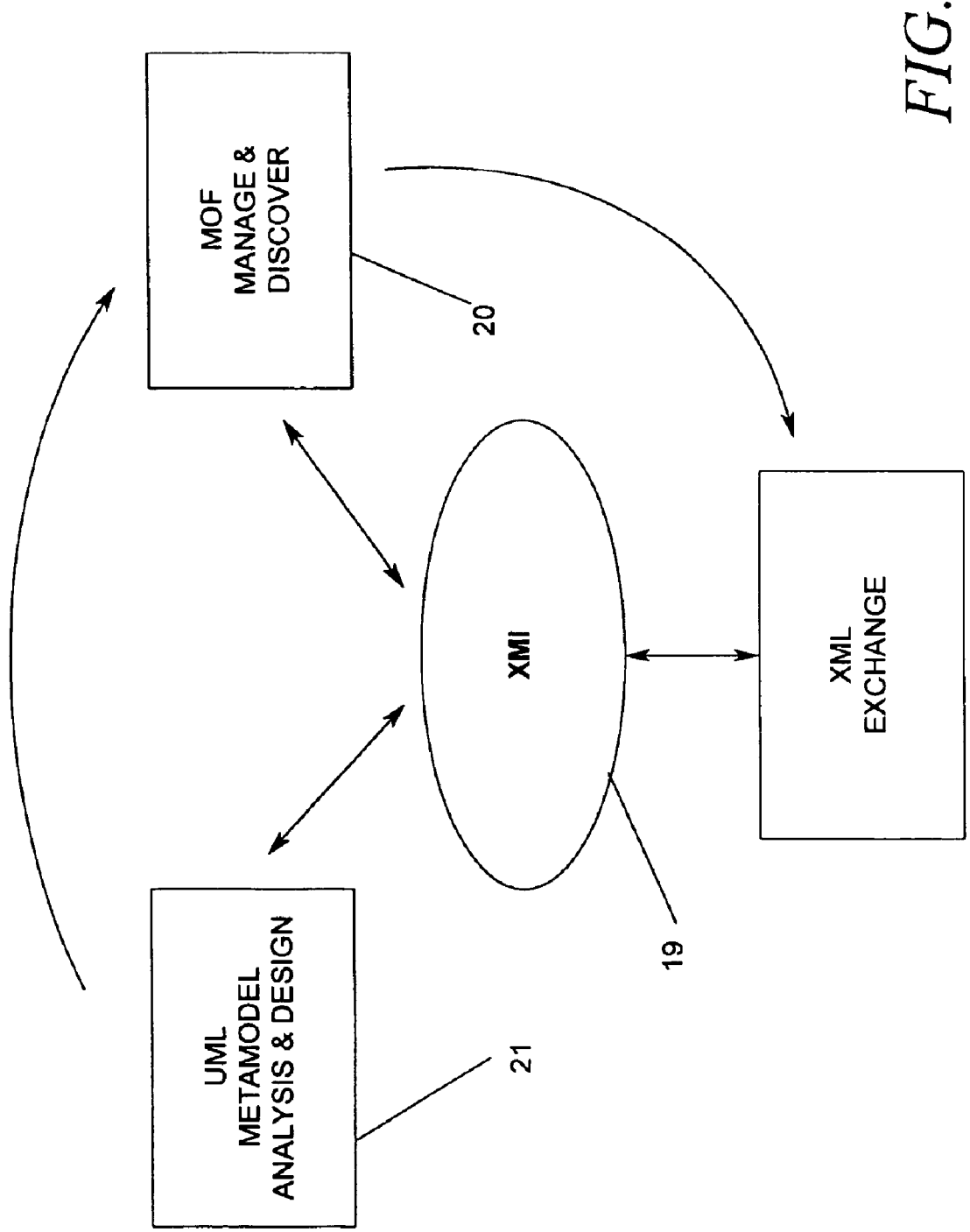
FIG. 2 is a diagram illustrating the use of XMI to integrate modeling and other software tools with the Web.

The integration alluded to above is illustrated in FIG. 2, wherein the UML metamodel analysis and design 21 are registered in a MOF model 20 in the repository 11 for managing and discovery. The XMI 19 is used to generate DTDs and streams (i.e., documents) for XML Exchange 25 between various tools, the repository and one or more tools or even between repositories. The XMI 19, together with MOF 20 and UML 21 form the core of the repository 11. The UML 21 standard defines a rich, object-oriented modeling language that is supported by a range of graphical design tools. The MOF 20 standard defines an extensible framework for defining models for metadata, and providing tools with programmatic interfaces to store and access metadata in the repository 11. The XMI 19 allows metadata to be interchanged as streams or files with a standard format based on XML. This architecture offers a wide range of implementation choices to developers of tools, repositories and object frameworks. An XML Exchange 22 is a standard, which allows interchange of information between tools and repositories. This exchange is illustrated in FIG. 1 by arrows 22A, 22B and 22C.

Figure 3:
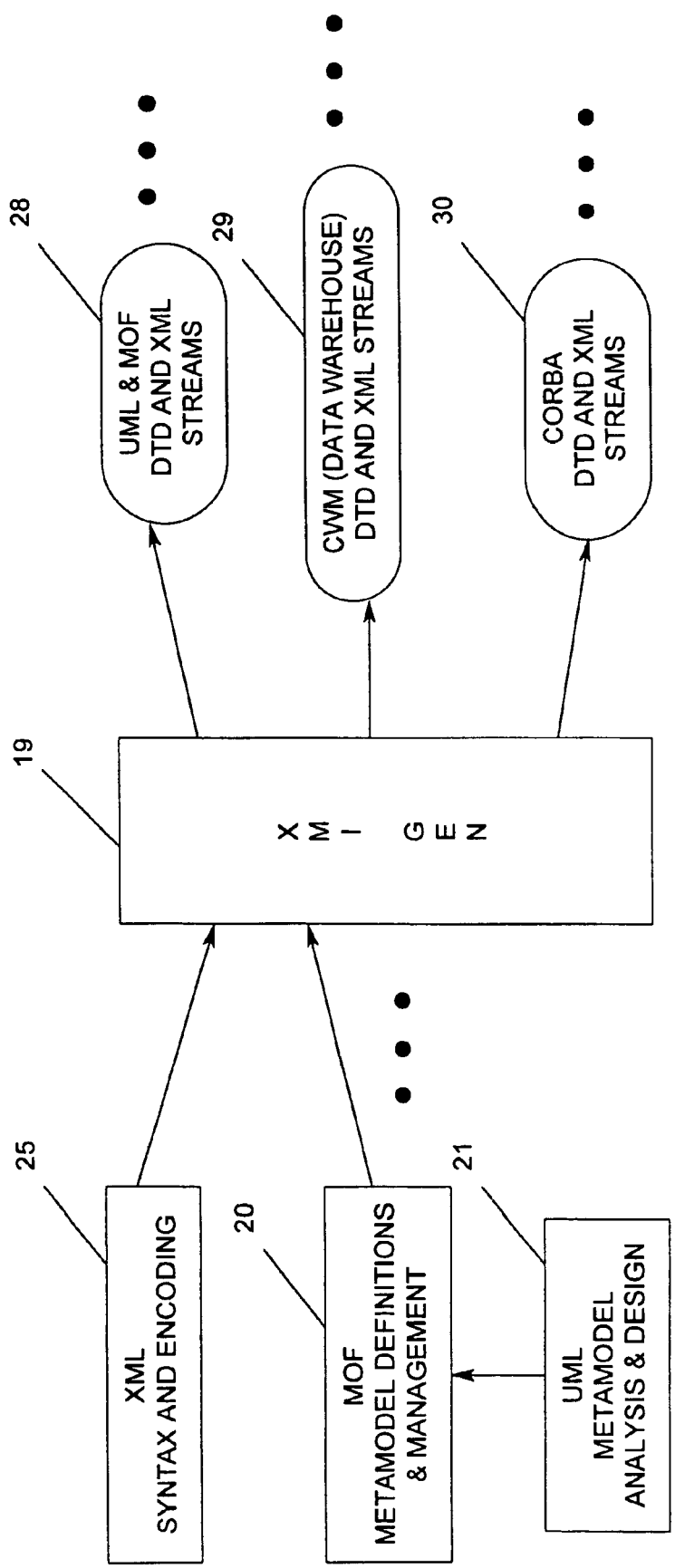
FIG. 3 is a block diagram of software modules in a run-time framework that may employ the present invention.

Referring now to FIG. 3, a software module block diagram of an exemplary run-time framework that may employ the method and system of the present invention is shown. A UML meta-model 21 is analyzed and designed before being populated with MOF meta-model definitions and management 20. The result is provided to the XMI 19 along with XML syntax and encoding 25. By the process of the present invention, UML and MOF DTD and XML data streams (e.g., documents) 28 are produced. Also, in the future the Common Warehouse Metadata Interchange, DTD and XML streams 29 may be produced along with CORBA DTD and XML streams 30. The present invention generates DTDs and streams for MOF compliant software models. In summary, if a set of concepts can be defined using MOF, the system can generate corresponding DTDs and streams.

XMI is an interchange format for metadata that is defined in terms of the Meta Object Facility (MOF) standard. The MOF technology was adopted by OMG for defining metadata and representing it as CORBA objects.

The MOF supports any kind of metadata that can be described using object modeling techniques. Such metadata may describe any aspect of a system and the information it contains, and may describe it to any level of detail and rigor, depending upon the metadata requirements.

MOF-based metadata is for use in a wide range of CORBA and non-CORBA related applications. For example:
  metadata repositories and tools that will support the process of analysis, design and development of CORBA-based software;
  metadata repositories that will support infrastructure services such as COS Trading, COS Events and ultimately the CORBA Interface Repository itself;
  metadata repositories that will support data warehousing, data mining and database interoperability; and,
  metadata that will be used to describe free-text data sources such as on-line document collections and the worldwide web.

In the MOF context, the term model has a broader meaning. Here, a model is any collection of metadata that is related in the following ways:
  The metadata describes information that is itself related in some way;
  The metadata all conforms to rules governing its structure and consistency; i.e. it has a common abstract syntax; and
  The metadata has meaning in a common (often implied) semantic framework.

The purpose of XML is to allow the interchange of models in a serialized form. Since the MOF is the OMG's adopted technology for representing metadata, it is natural the XMI proposal should focus on the interchange of MOF metadata; i.e., metadata that conforms to a MOF metamodel. In fact, XMI is really a pair of parallel mappings between MOF meta-models and XML DTDs, and between MOF metadata and XML documents.

XMI represents a new method for transferring metadata from one repository to another. Since XMI is a transfer format rather than a CORBA interface, there is no need for an ORB to ORB connectivity to effect the transfer; in fact any mechanism capable of transferring ASCII text will do, including storage media such as floppy disks or computer networks. Thus, XMI enables a new form of metadata interchange that significantly enhances the usefulness of the MOF.

XMI can be viewed as a common metadata interchange format that is independent of middleware technology. Any metadata repository or tool that can encode and decode XMI streams can exchange metadata with other repositories or tools with the same capability. There is no need to implement the MOF defined CORBA interfaces.

Referring now to FIG. 4, a matrix diagram showing the levels of abstraction of data in a meta-model architecture of corresponding data-interchange formats is shown. While there are typically four layers in a MOF-based metadata stack, the number of layers can be ore or less than this. In the example shown in FIG. 4, the MOF meta-metamodel is an M3-level model in a 4-level stack. The "meta" prefix should be viewed in a relative rather than absolute sense. Similarly, the numbering of meta-levels is not absolute. The first column list the level, the second column lists metadata, which is programmatic, while the third column list the XMI DTSs, which relate to documents. The fourth column identifies the documents.

As stated above, it is an object of the present invention to provide a method and system for interchanging metadata for any MOF metamodel. Accordingly, DTD generation and stream production rules are set forth that can be used to transfer any model described by a MOF metamodel; i.e., any metamodel that is defined in the "abstract language" of the MOF Model. Since the MOF Model is itself described as a MOF metamodel, the invention also allows interchange of metamodels and even the MOF Model itself. Since one is able to the abstract to levels of the MOF, the present invention enables one to generate the import/export routines or programs for any MOF compliant model.

FIG. 4 shows how XMI artifacts fits into the four-layer metadata architecture. An XMI document (M1 el) is used to transfer an M1-level model. This is described by an XML DTD (M2 level) that corresponds to the MOF metamodel for the metadata (also M2 level). For example, a UML model would be encoded against a UML DTD, which corresponds to the UML metamodel. MOF compliant metamodels can be interchanged at the next meta-level in the metadata architecture. Thus, an M2 level metamodel such as the UML metamodel can be encoded against the M3 level XML DTD for the M3 level MOF Model.

Figure 5:
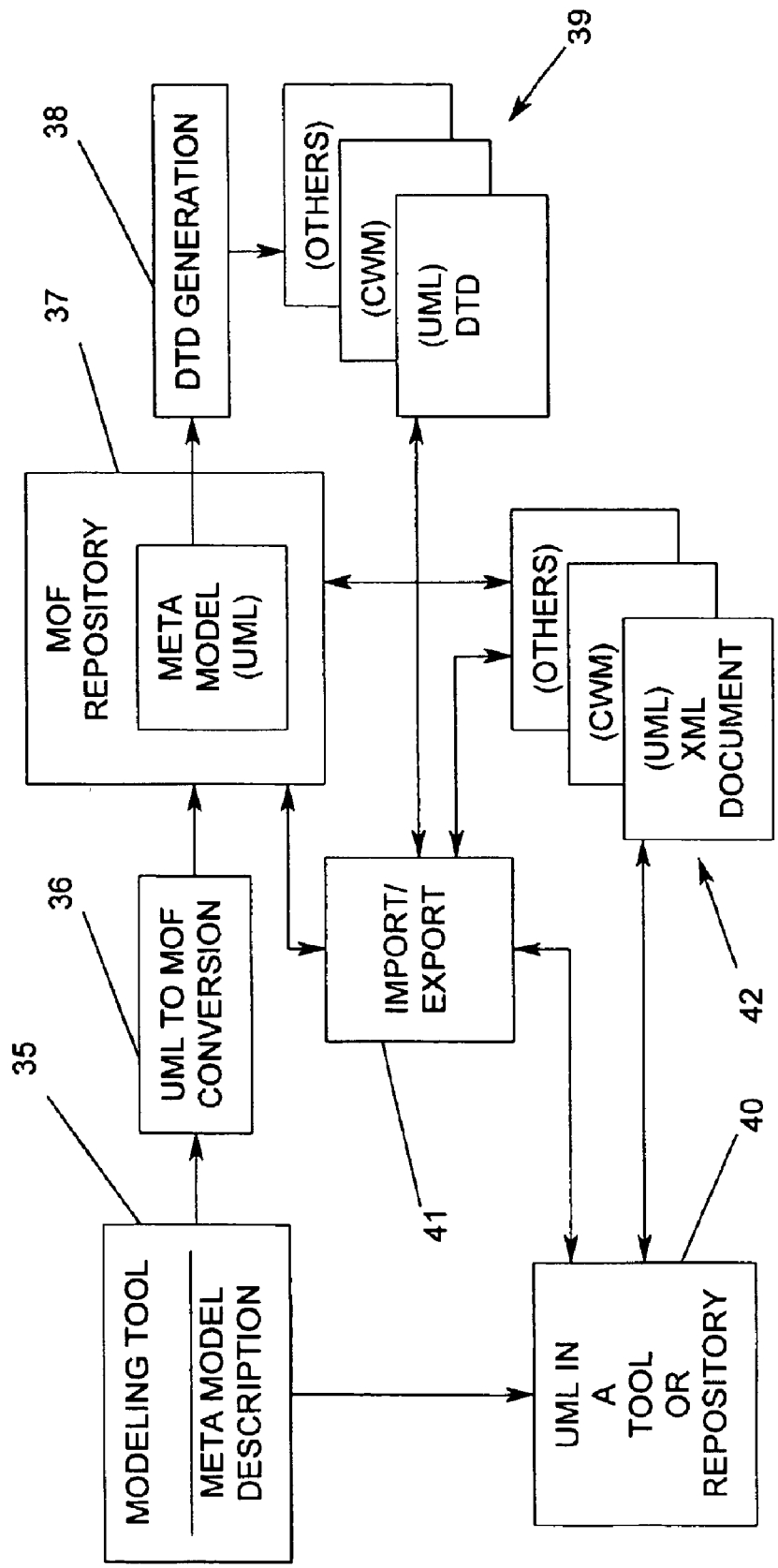
FIG. 5 is a block diagram of an implementation of the meta-model architecture of FIG. 3.

Referring now to FIG. 5, a block diagram of an implementation of the meta-model architecture of the present invention is shown. First, a modeling tool 35 containing a metamodel description passes the model through a UML to MOF conversion 36 for storage in a MOF repository 37 as a metamodel (UML). Such a conversion may be made by use of the method disclosed in the above-cited co-pending application Ser. No. 09/322,137, now issued as U.S. Pat. No. 6,292,932. Next, DTDs 39 in UML, or Common Warehouse Metadata Interchange ("CWM") or others, are created by a DTD generation 38. The method to accomplish the DTD generation may be accomplished by using a method disclosed in one of the three above-cited co-pending applications Ser. No. 09/282,102, now issued as U.S. Pat. No. 6,253,366, 09/282,230, now issued as U.S. Pat. No. 6,381, 743, or 09/282,345, now issued as U.S. Pat. No. 6,289,501. Alternatively, a UML compliant tool 40 uses an import/export process 41 to store a metamodel in the MOF repository 37. The UML in the tool 40 is also capable of generating XML documents 42 in UML, or CWM, or others. Import is a process of reading models as XMI streams that conform to a particular DTD. Export is a process of transferring XMI streams that conform to a particular model using a specific DTD.

Figure 6:
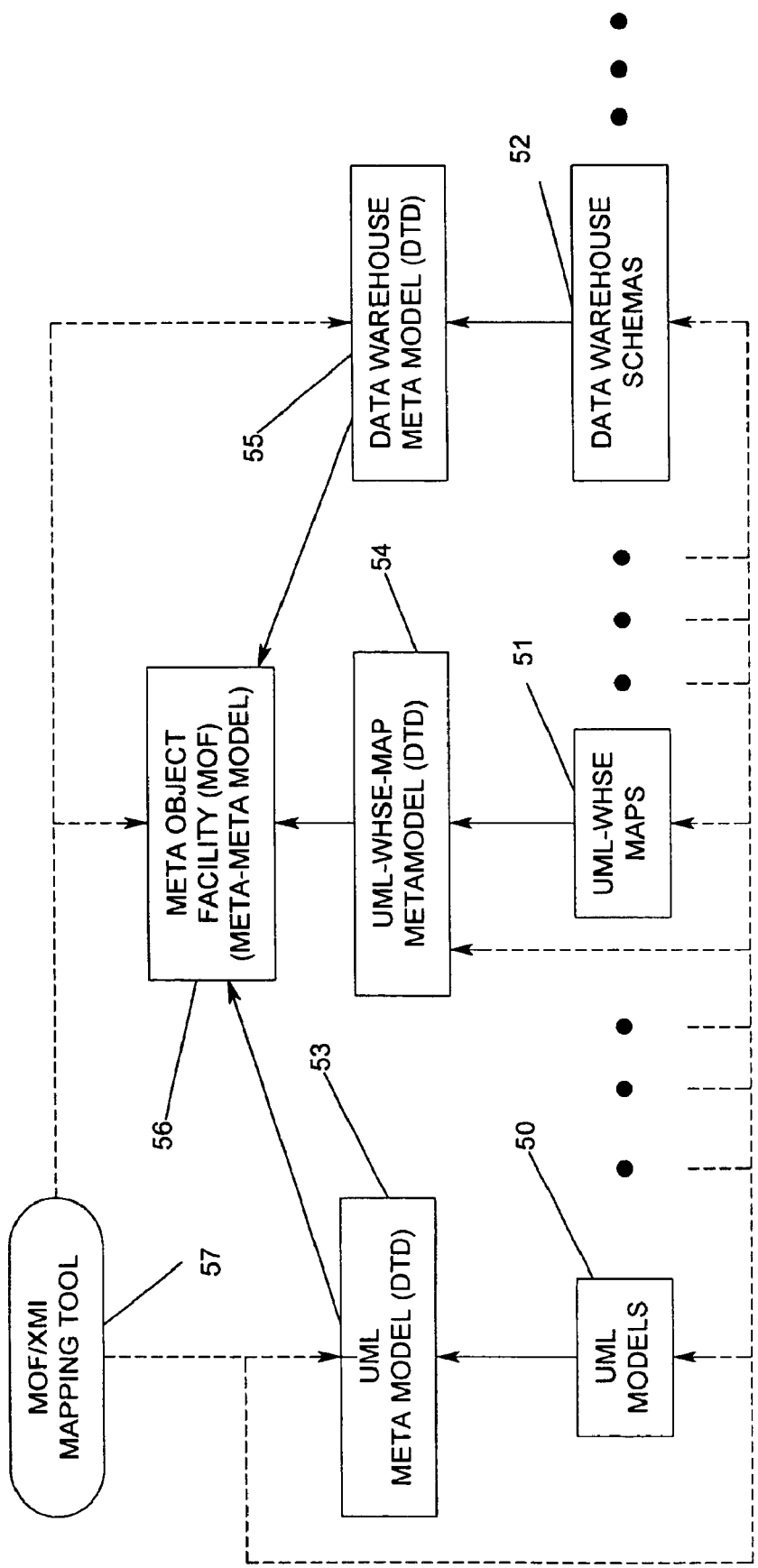
FIG. 6 is a diagram illustrating an exemplary use of XMI in the translation of a meta-meta model from a MOF tool to an UML tool to a data warehouse model, etc.

Referring now to FIG. 6, a diagram illustrating an exemplary use of XMI in the use of a meta-meta model to define UML, UML-Warehouse-Map, Data Warehouse Meta model is shown. UML models 50, UML-Warehouse Maps 51 and Data Warehouse Schemas 52 correspond to the M1 level of models shown in FIG. 4. A UML metamodel (DTD) 53, a UML Warehouse Map Metamodel (DTD) 54 and a Data Warehouse metamodel (DTD) 55 are all on the M2 level, whereas a MOF meta-metamodel 56 is on the M3 level.

FIG. 6 illustrates how multiple meta models 53, 54 and 55 can be defined by a MOF model 56 and stored in a MOF repository. Also, it is shown how UML model 50 can be defined by UML metal model 53 and stored in a UML repository. In a similar manner, UML Warehouse Map 51 can be defined by UML Warehouse Map meta model 54; and, Data Warehouse Schemas 52 can be defined by Data Warehouse meta model 55.

Finally, an MOF/XMI mapping tool can read all the information in the UML models 50, the UML meta model 53; as well as the Data Warehouse Schemas 52 and the Data Warehouse meta model 55, and enable transformation between UML metadata and Data Warehouse metadata using the mapping rules specified in the UML Warehouse Map 51.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method for effecting data interchange between a Universal Modeling Language (UML) compliant software tool and a Meta Object Facility (MOF) compliant repository, the UML compliant software tool and the MOF compliant repository being included in a computer system and coupled together in a distributed heterogeneous environment, the method comprising the steps of:
   a. registering and storing metadata describing a meta-model in the MOF compliant repository;
   b. generating a set of rules corresponding to the metadata, wherein the set of rules is XML Document Type Definitions (DTD);
   c. generating a stream of data representing a document corresponding to the meta-model based on the set of rules wherein the stream of data conforms to XML Metadata Interchange standard;
   d. transmitting from the repository the stream of data, using an exporter module; and,
   e. receiving at the software tool the transmitted stream of data, using an importer module.

2. A storage medium encoded with machine-readable computer program code for effecting data interchange among software tools and repositories in a distributed heterogeneous environment, wherein, when the computer program code is executed by a computer system having at least one Universal Modeling Language (UML) compliant software tool and at least one Meta Object Facility (MOF) compliant repository, the computer system performs the steps of:
   a. registering and storing metadata describing a meta-model in the at least one MOF compliant repository;
   b. generating a set of rules corresponding to the metadata, wherein the set of rules is XML Document Type Definitions (DTD);
   c. generating a stream of data corresponding to the meta-model based on the set of rules, wherein the stream of data conforms to XML Metadata Interchange standard;
   d. transmitting from the at least one MOF compliant repository the stream of data, using an exporter module; and,
   e. receiving at the at least one UML compliant software tool the transmitted stream of data, using an importer module.

3. A method for facilitating data interchange in a computer system including a Universal Modeling Language (UML)-based software tool and a Meta Object Facility (MOF)-based repository, the method comprising the steps of:
   a. registering and storing metadata describing a UML-based meta-model in the MOF-based repository;
   b. generating XML Document Type Definitions corresponding to the metadata of the UML-based meta-model; and
   c. generating an XMI stream corresponding to the UML-based meta-model using the XML Document Type Definitions;
   d. transmitting the XMI stream from the MOF-based repository to the UML-based software tool, via an exporter module; and
   e. receiving the XMI stream, at the UML-based software tool, via an importer module.

4. The method of claim 3 wherein the computer system includes a second repository, the method further comprising:
   d. transmitting the XMI stream from the MOF-based repository to the second repository, via an exporter module; and
   e. receiving the XMI stream, at the second repository, via an importer module.

5. The method of claim 4 wherein the second repository is compliant to UML standard.

6. The method of claim 4, further comprising:
   f. transforming the received XMI stream into corresponding metadata, via the importer module; and
   g. storing the corresponding metadata in the second repository.

7. The method of claim 6 further comprising:
   h. transmitting a second XMI stream from the second repository to the MOF-based repository, via a second exporter module; and
   i. receiving the second XMI stream, at the MOF-based repository, via a second importer module.

8. The method of claim 7 further comprising:
   j. transforming the received second XMI stream into corresponding meatadata, via the second importer module; and
   k. storing the corresponding metadata in the MOF-based repository.

* * * * *